Figure 1:
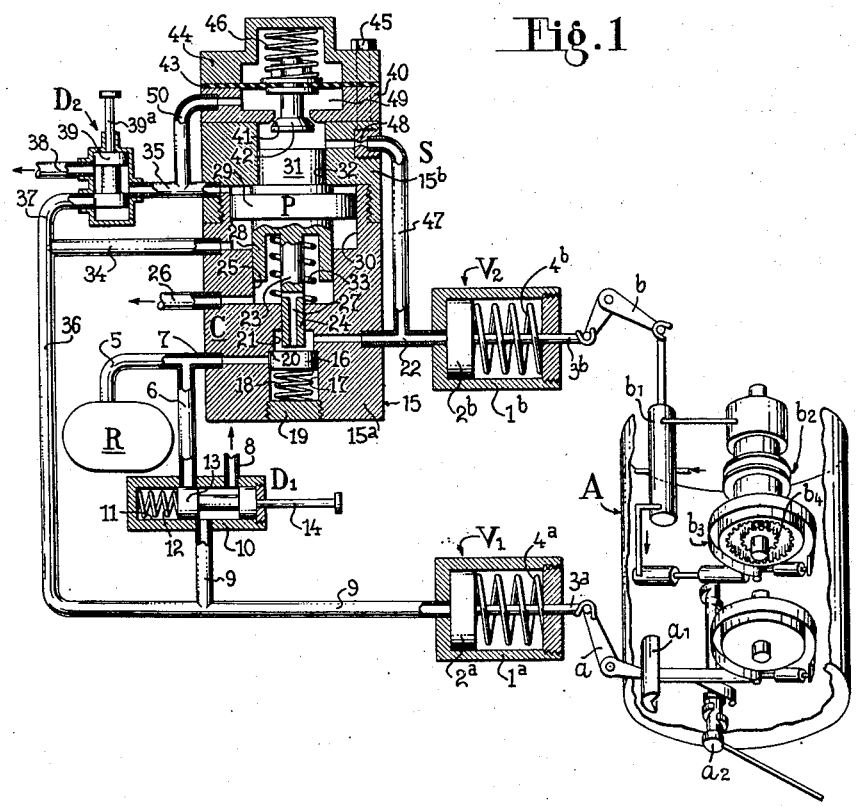

United States Patent Office 2,859,593
Patented Nov. 11, 1958

2,859,593

CONTROL MECHANISM AND APPLICATIONS THEREOF PARTICULARLY IN CHANGE-SPEED GEARS

Jean-Paul Brunot, Sens, France, assignor to Compagnie de Pont-A-Mousson, Nancy (Meurthe-et-Moselle), France, a French body corporate Application July 24, 1957, Serial No. 673,777

Claims priority, application France July 26, 1956

4 Claims. (Cl. 60—97)

The object of the present invention is to provide a control mechanism controlling two separate devices, said mechanism permitting exerting two separate manually controlled actions, the first action being on one of said devices and independent of the second action on the other device, and the second action being manually preselected and then automatically achieved by the direct manual engagement of the first action.

This mechanism comprises in combination: a source of fluid under pressure; a first and a second single acting fluid motor or ram connected in parallel to said source and adapted to exert respectively said first and said second actions; a manual control directional valve disposed between said source and said first fluid motor for connecting said first fluid motor either to said source for exerting said first action or to the exhaust; a closing device disposed between said source and said second fluid motor and having two positions respectively corresponding to the connection of said second fluid motor to said source for exerting said second action or to the exhaust; a servo-control device subjected to the action of said fluid for moving said closing device and maintaining the latter in one of its positions; and a preselector directional valve for connecting said servo-control device either to the inlet of said first fluid motor or to the exhaust, whereby manual action on said control directional valve results in an action on said closing device through the medium of said servo-control device in accordance with the position of said preselector directional valve.

Preferably, the fluid under pressure is oil or other liquid.

A further object of the invention is to provide various applications of the control mechanism of the invention.

This mechanism is particularly applicable to the control of change-speed gears and like structures, in which speeds are preselected and in which there are provided two actuating devices at least one of which enters into action only for certain gear ratios. This is particularly the case in the control, by means of a fluid under pressure, of change-speed gear units known as Wilson gear boxes in which an overdrive gear train is capable of being put into or out of action for each of the normal gear ratios of the gear box. In combining the additional overdrive gear train with the other gear trains or in putting the overdrive gear train out of action, it is possible to obtain two ranges of transmission ratios one of which is normal and the other stepped up. In this way, the number of possible speeds of a change-speed gear unit is doubled, although the space taken up by the latter is not materially increased.

It is known that the Wilson preselector gear unit comprises a speed change lever actuating the brake band or bands of the epicyclic gear trains of the unit through the medium of a bar and other members, an auxiliary cam shaft permitting preselecting the brake band or bands which will be brought into action by the speed change lever, which has a plurality of branches.

When the Wilson gear unit is controlled by a fluid under pressure, the shifting of said lever is subjected to the action (first action) of a single acting fluid motor or ram which is put under pressure only when changing speeds and is connected to the exhaust when the speed has been engaged. Putting the ram under pressure releases the previously engaged brake bands and applies or engages new brake bands corresponding to the new ratio, preselected by the cam shaft.

When the Wilson gear unit comprises an overdrive gear train the latter may be put into or out of action also by a second fluid motor or ram using a fluid under pressure (second action).

The control mechanism of the invention, when applied to a Wilson gear unit, permits preselecting in the same way as the other speeds the bringing into action or the putting out of action of the second ram controlling engagement of the overdrive gear train.

To this end, and according to the invention, the first ram of the control mechanism performs the function of a conventional ram which, in the Wilson gear unit, ensures, in cooperation with the preselecting cam shaft, the normal passage from one speed ratio to another, whereas the second ram, under the control of the preselecting directional valve brings in action or puts out of action the overdrive gear train.

As other applications of the mechanism of the invention, there may be mentioned the control of multi-tool machines, in which a first set of tools or tool operating means may be put into operation (first action) independently of a second set of tools or tool operating means or in combination (second action) with the first set of tools. There may also be mentioned a control of a plurality of handling apparatus which operate together and/or separately, the first action bringing into operation one group of apparatus whereas the second action, combined with the first action, brings into operation a second group of apparatus co-operating with the first group.

Further features and advantages of the invention will be apparent from the ensuing description with reference to the appended drawings, to which the invention is in no way limited.

Figure 2:
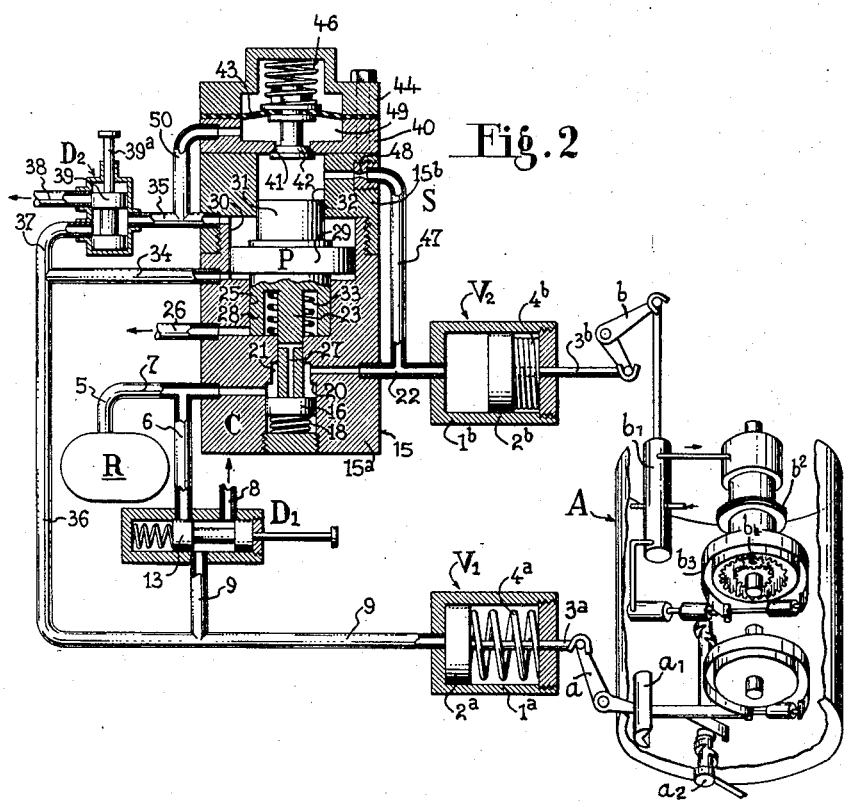

In the drawings:

Fig. 1 is a diagrammatic sectional view of a control mechanism embodying the invention shown applied to a Wilson change-speed gear unit having an overdrive, one speed of the overdrive range of speeds being engaged, and Fig. 2 shows the same mechanism, a speed of the normal range of speeds being engaged.

The mechanism of the invention is applied to the control of a Wilson change-speed gear unit A having an overdrive gear train. It is known that in this change-speed gear unit a first lever $a$ ensures, in acting on a bar $a_1$, the engagement of the speeds, a preselection of which is effected by a preselecting cam shaft $a_2$. Further, a second lever $b$ actuates, through the medium of a directional valve $b_1$, a clutch $b_2$ and a brake $b_3$ which put in action an overdrive gear train $b^4$ when the clutch $b^2$ is disengaged and the brake $b^3$ applied, this gear train being out of action when the clutch $b^2$ is engaged and the brake $b^3$ released.

This Wilson gear unit is well known and there is no need to describe it in detail, since, moreover the levers $a$ and $b$ could represent any other means which undergo displacements similar to those described hereinafter.

The control device comprises mainly a supply circuit of fluid under pressure for supplying fluid to a first fluid motor or ram $V_1$ and a second fluid motor or ram $V_2$ under a manual control exerted by a control directional valve $D_1$ and a preselector directional valve $D_2$, the ram V₂ being supplied with fluid through the medium of a servo-control device S and being under the effect of notably the opening of a closing device C in the known manner.

The single acting rams V₁ and V₂ have their cylinders 1ᵃ and 1ᵇ fixed in position whereas their pistons 2ᵃ, 2ᵇ are connected by their rods 3ᵃ, 3ᵇ respectively to the levers a, b. The pistons are urged toward the left, as viewed in Fig. 1, by spring 4ᵃ, 4ᵇ.

The fluid under pressure is supplied by any source, for example a tank R. The fluid from the latter passes through a pipe 5 which is divided into two branches 6 and 7. The branch pipe 6 is connected to the directional three-way valve D₁ the pipe of one of the ways being constituted by the pipe 6 and the pipes of the other two ways by an exhaust pipe 8 and a pipe 9 connected to the inlet of the ram V₁. The body 10 of the valve D₁ has a bore 11 in which is movable, in opposition to the action of a return spring 12, a slide 13 having a rod 14 on which the operator acts, for example through the medium of the clutch pedal of the vehicle. The slide 13 is capable of occupying two positions: in one position, the spring 12 is extended, the pipe 9 is connected to the exhaust pipe 8, and the pipe 6 supplying fluid under pressure is closed. In the other position of the slide 13, the spring 12 is compressed and the pipe 9 is connected to the pipe 5 supplying fluid under pressure and the exhaust pipe 8 is closed.

The other branch pipe 7 is connected to the closing device C which is connected to a servo-control device S disposed with the device C in a body generally indicated by the reference numeral 15 and comprising parts 15ᵃ, 15ᵇ, 40, 44 held assembled by screws 45. The closing device C comprises a valve 16 which forms a piston in a bore 17 in the body 15 and is subjected to the action of a return spring 18 which bears against a plug 19. The valve 16 is in a closing position (Fig. 1) of abutment against a shoulder 20 (Fig. 2) which forms a seating for the valve and above which there is provided a chamber 21 to which is connected the supply pipe 22 of the ram V₂.

The closing valve 16 is capable of being separated from its seating 20 by a rod 23 which is independent of the valve and slides in a bore 24 adjacent the chamber 21 and connected to another larger bore 25 coaxial therewith. An exhaust pipe 26 is connected to this latter bore. The rod 23 comprises a longitudinal passageway 27 communicating at one end with the chamber 21 and at the other end with the cylindrical surface of the rod in the bore 25 by way of a series of radial apertures so that this passageway 27 puts the chamber 21 in communication with the lower part of the bore 25.

The rod 23 is connected to a triple differential piston P formed by a first portion 28 movable in the bore 25, a second portion 29 movable in a bore 30 whose diameter is greater than that of the bore 25, and a third portion 31 disposed in a further bore 32 whose diameter is less than that of the bore 25 and is formed in the upper part of the body 15.

A return spring 33 compressed between the bottom of the bore 25 and the portion 28 of the piston P, biases the latter, and in consequence the rod 23, upwardly so as to prevent the latter from exerting pressure on the closing valve 16 and to connect the chamber 21 to the exhaust pipe 26 by way of the passageway 27.

Pipes 34 and 35 are respectively connected to the lower and upper ends of the large bore 24. These two pipes are adapted to supply the fluid under pressure respectively to the lower face and upper face of the portion 29 of the piston P. The pipe 34 is connected to the supply pipe 9 of the ram V₁ by way of a pipe 36, and to one of the pipes of the three-way valve V₂ by way of a pipe 37.

One of the other two pipes of this directional valve V₂ is connected to the pipe 35 whereas the third pipe is connected to the exhaust at 38. Movable in this valve V₂ is a slide 39 provided with an operating rod 39ᵃ and capable of occupying two positions. In one of these positions (Fig. 1) the passageway 37 is closed, the pipe 35 being connected to the exhaust at 38, and in the other position (Fig. 2) the pipe 35 is connected to the pipe 37, the exhaust pipe 38 being closed.

The part 40 of the composite body 15 is formed of a ring provided with an aperture 41 which is coaxial with the bores 32, 30, 25 and whose lower edge forms a seating for a valve 42. The stem of this valve is connected to an elastic and fluid-tight diaphragm 43 the peripheral part of which is clamped between the ring 40 and the cap 44 of the body 15 by screws 45. A spring 46 is disposed between the cap 44 and the end of the stem of the valve 42 and tends to maintain the latter separated from its seating.

Connected to the upper part of the bore 32, between the portion 31 of the piston P and the valve 42, is a pipe 47 provided with a constricted passageway 48 and connected to the fluid supply pipe 22 of the ram V₂. Communicating with the chamber 49 located between the valve 42 and the diaphragm 43 is a pipe 50 connected to the pipe 35.

The mechanism of the invention operates in the following manner:

Assuming that the directional valves D₁ and D₂ are in the position shown in Fig. 1, the supply of fluid under pressure from the tank R is cut off in the two branch pipes 6 and 7 and the rams V₁ and V₂ are connected to the exhaust pipe at 8 and 38 respectively. Their pistons 2ᵃ and 2ᵇ are urged toward the left by the springs 4ᵃ and 4ᵇ. The pipe 37 is closed and the pipe 35 is connected to the exhaust at 38.

In the presently-described application of the invention to the change-speed gear unit A, these positions correspond, for example, to one of the engaged speeds of the gear unit, the overdrive device being in service as mentioned hereinbefore, the brake b³ being applied and the clutch b² disengaged. The transmission ratio of the change-speed gear unit is changed by acting on the directional valve D₁, or more exactly by moving the operating rod 14 in opposition to the action of the spring 12. In this movement, the fluid under pressure is supplied to the ram V₁ which controls the speed change lever a of the change-speed gear unit (a different ratio had been preselected by means of the preselecting cam shaft, not shown in the drawing). Further, the fluid under pressure passes through the pipes 36 and 34 and enters the bore 25 in which it exerts pressure on the lower face of the portion 28 of the piston P which it tends to maintain in its upper position. It will be observed that this piston P is already in its upper position owing to the action of the return spring 33, and that, in consequence, the valve 16 of the closing device C is applied against its seating 20 and closes off communication between the pipe 7 and the supply pipe 22 of the ram V₂.

Any other change of speed obtainable with the change-speed gear unit is effected in the same manner without filling the ram V₂ and putting the overdrive device out of action.

When it is desired to disengage the overdrive device, it is merely necessary to move the slide 39 of the valve D₂ and to bring it to the position shown in Fig. 2 in which the pipe 37 is connected to the pipe 35. It will be observed that this movement does not in any way change the supply of fluid to the ram V₁, since the valve D₁ still closes the pipe 6 in its position of rest corresponding to an engaged gear speed (Figs. 1 and 2).

On the other hand, to obtain a speed change the valve D₁ is actuated, the ram V₁ is supplied with fluid under pressure, as in the first case, but at the same time, owing to the fact that the valve D₂ is in the position shown in Fig. 2, the fluid under pressure acts on the two sides or faces of the portion 29 of the piston P by way of the pipes 34 and 35. The upper face of this portion 29 is larger than that of the lower face and the piston P is urged downwardly in opposition to the action of the return spring 33. This piston lowers the rod 23 which bears against the valve 16 and firstly causes closure of the radial apertures of the passageway 27 and then urges the valve 16 downwardly and thus opens the communication between the pipe 7 and the pipe 22. The ram $V_2$ is supplied with fluid, the overdrive device is put out of action by its lever $b$ which, by means of the directional valve $b_1$, releases the brake $b_3$ and engages the clutch $b_2$.

At the same time, the fluid under pressure passes through the pipe 47 and acts on the upper face of the portion 31 of the piston P. When the slide of the valve $D_1$ is released (Fig. 2) the speed having been changed, the ram $V_1$ is connected to the exhaust pipe 8 together with the pipes 36, 34 and 35 while fluid under pressure continues to flow through the pipe 47 and acts on the upper face of the piston P, the valve 16 is still held in its open position and the ram $V_2$ is still supplied with fluid under pressure on condition that the valve 42 is held against its seating 41 in the position shown in Fig. 2.

Provision of this valve 42 prevents the ram $V_2$ from being supplied with a fluid pressure less than that required for putting the overdrive gear train out of action. If this pressure were insufficient, the gear train would remain partly engaged which would generate heat and destroy the friction bands of this gear train. To this end, the spring 46, which tends to separate the valve 42 from its seating 41, is selected to exert a force corresponding to the limiting pressure defined hereinbefore, namely the minimum pressure below which the overdrive gear train must not be put out of action.

Under these conditions, the valve $D_2$ having been previously brought to the position shown in Fig. 2, when changing speed in operating on the valve $D_1$ the fluid under pressure is sent through the pipes 34 and 35 and is at the same time directed through the pipe 50 under the diaphragm 43. The fluid admitted into the chamber 49 momentarily escapes toward the pipe 47 through the aperture 41, since the valve 42 is still lowered, but, owing to the constricted passageway 48, this escape of fluid is negligible and in the chamber 49 there is rapidly attained the pressure at which the diaphragm 43 is raised in opposition to the action of the spring 46, which applies the valve 42 against its seating.

On the other hand, if the pressure in the ram $V_2$ is less than the minimum desired pressure, the valve 42 remains separated from its seating (the aperture thus obtained is definitely greater than the cross-sectional area of the constricted passageway 48) and when the valve $D_1$ is released and the pipes 34, 35 and 37 are connected to the exhaust, there is obtained a connection between the chamber 32 situated above the piston P and the exhaust by way of the aperture 41 and the pipe 50. Under these conditions, the piston P returns to its upper position and in this way any partial engagement of the overdrive gear train is avoided.

Any subsequent speed change effected by means of the valve $D_1$, the valve $D_2$ remaining in the position shown in Fig. 2, gives a given ratio of the speed change gear unit without overdrive. To obtain an overdrive speed, it suffices to bring the valve $D_2$ to the position shown in Fig. 1, and, in the course of actuating the valve $D_1$, the fluid under pressure passes through the pipe 34 and acts solely on the lower face of the portion 29 of the piston P. As the area of this portion is greater than that of the portion 31, the piston P rises and causes closure of the valve 16 owing to the action of the spring 18, and, at the end of its travel, it puts the chamber 21 in communication with the exhaust 26 by way of the pipe 27. The ram $V_2$ is then emptied and the overdrive device is put into operation.

It can be seen that, owing to the mechanism of the invention, the engagement of the overdrive gear train is preselected in acting on the valve $D_2$ the actual engagement being effected by the valve $D_1$ (the bringing in action or putting out of action or clutch disengagement or engagement).

It will be also observed that, owing to the servo-control of the invention, the closing device C may be maintained automatically in its open position so long as the preselecting valve $D_2$ is held in its position shown in Fig. 2. Further, owing to the valve 42, the piston P is automatically placed in the position for which the ram $V_2$ is connected to the exhaust as soon as the fluid supply pressure of this ram falls below a predetermined minimum pressure.

Although a specific embodiment of the invention has been described, many modifications and changes may be made therein without departing from the scope of the invention as defined in the appended claims.

Thus, according to another embodiment, the overdrive gear train may be engaged by putting the ram $V_2$ under pressure. In this case, the spring 46 is so selected that its force corresponds to the required minimum pressure for putting the overdrive gear train in action, the gear train being disengaged if this minimum pressure is not reached in the ram $V_2$. In this manner, any partial engagement of the overdrive gear train is avoided, as in the embodiment described hereinbefore.

Having now described my invention what I claim as new and desire to secure by Letters Patent is:

1. A mechanism comprising in combination: a first device and a second device to be controlled in such manner that the action exerted on the first of said devices is independent of the action exerted on the second of said devices and that said last-mentioned action is preselected manually and then automatically exerted by manually exerting said first action on the first of said devices; a source of fluid under pressure, a first single-acting fluid motor and a second single-acting fluid motor which have inlet apertures connected in parallel to said sources and pistons respectively connected to said first and second devices for exerting respectively said first and second actions; a manually controlled directional valve disposed between said source and said first fluid motor for selectively connecting the latter to said source for exerting said first action and to the exhaust; a closing device disposed between said source and said second fluid motor and having two positions respectively corresponding to the connection of said second fluid motor to said source for exerting said second action and to the exhaust, said closing device comprising: a body in which is formed a bore which is provided with a shoulder and connects said source to said second fluid motor, a piston valve slidably mounted in said bore, a spring for returning said piston valve to said shoulder forming a valve seating, and a rod provided with a passageway which communicates, at one end, with an exhaust and, at its other end, with the end of said piston valve, whereby said passageway, which is opened when said rod is separated from said piston valve, is closed as soon as said rod exerts pressure on said piston valve and separates the latter from its seating; a servo-control device subjected to the action of said fluid and connected to said rod; and a preselector directional valve for connecting said servo-control device selectively to the inlet aperture of said first fluid motor and to the exhaust, whereby the manual action on said manually controlled directional valve results in an action on said closing device and in consequence on the supply to said second fluid motor through the medium of said servo-control device in accordance with the position of said preselector directional valve.

2. Mechanism as claimed in claim 1, wherein said servo-control device comprises, disposed in said body, a stepped bore having three different diameters and a differential piston which has three corresponding diameters and is movable in said bore and comprises a first portion which has a medium diameter extended by said rod and is adjacent a second portion of large diameter which is in turn adjacent a third portion of small diameter, the chambers formed in said stepped bore by the forward faces of said first and second portions of said piston being permanently and respectively connected to the exhaust and to the inlet aperture of said first fluid motor, whereas the chamber formed by the rear face of said second portion is connected to said preselector directional valve which is adapted to selectively connect it to the exhaust and to said inlet aperture of said first fluid motor, the chamber formed by the rear face of said third portion being connected to the supply aperture of said second fluid motor.

3. Mechanism as claimed in claim 2, wherein said servo-control device is provided with a discharge valve adapted to prevent supply of fluid to said second fluid motor if the available pressure is insufficient.

4. Mechanism as claimed in claim 3, comprising in said body a recess, a deformable diaphragm fixed in said body for closing said recess and constituting a discharge chamber, a discharge aperture formed in said body and connecting said discharge chamber to said portion of said bore in which said third portion of said piston moves, said discharge valve being fixed to said diaphragm so as to control said discharge aperture, a spring which bears against the side of said diaphragm opposite to that against which said discharge valve bears for deforming said diaphragm in such manner that said discharge valve opens said discharge aperture when the pressure in said discharge chamber falls below a predetermined value, a pipe connecting said discharge chamber to said preselector directional valve in parallel with said chamber formed by said rear face of said large diameter portion of said piston so that said discharge chamber is connected to the exhaust when said preselector directional valve is at rest, and a constricted passageway connecting said portion of said bore in which said third portion of said piston moves to the supply aperture of said second fluid motor, whereby said second fluid motor is connected to the exhaust and thus held in its position of rest through said discharge aperture, said discharge chamber, said pipe and said preselector directional valve if it is supplied with pressure lower than said predetermined value.

References Cited in the file of this patent
UNITED STATES PATENTS 2,707,887    Slack _____ May 10, 1955